(12) United States Patent
Axtell

(10) Patent No.: US 6,246,125 B1
(45) Date of Patent: Jun. 12, 2001

(54) PORTABLE WIND AND HYDRO ELECTRIC GENERATING SYSTEM

(76) Inventor: Robert C. Axtell, 838 Miller Ct., Lakewood, CO (US) 80215

( * ) Notice: Subject to any disclaimer, the term of this patent is extended or adjusted under 35 U.S.C. 154(b) by 0 days.

(21) Appl. No.: 09/625,369

(22) Filed: Jul. 25, 2000

(51) Int. Cl.[7] ................................ F03D 1/02; F03D 7/02; F03B 13/14; F03B 13/24; F03B 15/00; F03B 15/04

(52) U.S. Cl. ............................. 290/1 A; 290/42; 290/43; 290/53; 290/54; 416/85; 415/7; 415/60; 415/151

(58) Field of Search .................... 290/42, 43, 53, 290/54; 416/85; 405/75, 80; 415/151, 60, 7

(56) References Cited

U.S. PATENT DOCUMENTS

| 4,053,787 | 10/1977 | Diggs . | |
|---|---|---|---|
| 4,241,283 | 12/1980 | Storer, Sr. . | |
| 4,270,056 | 5/1981 | Wright . | |
| 4,443,707 | 4/1984 | Scieri et al. . | |
| 4,467,218 | 8/1984 | Andruszkiw et al. . | |
| 4,717,831 | 1/1988 | Kikuchi . | |
| 5,139,264 | * 8/1992 | Wooten ............................ | 273/191 R |
| 5,430,332 | 7/1995 | Dunn, Jr. . | |
| 5,440,176 | * 8/1995 | Haining ................................. | 290/54 |
| 5,613,950 | * 3/1997 | Yoon .................................... | 604/105 |
| 5,644,170 | * 7/1997 | Bynum et al. ......................... | 290/43 |
| 5,834,853 | * 11/1998 | Ruiz et al. ............................ | 290/54 |
| 5,882,143 | 3/1999 | Williams, Jr. . | |
| 5,966,912 | * 9/1999 | Carter et al. ...................... | 52/396.02 |
| 6,051,892 | * 4/2000 | Toal, Sr. ............................... | 290/43 |

* cited by examiner

Primary Examiner—Nestor Ramirez
Assistant Examiner—Julio Gonzalez
(74) Attorney, Agent, or Firm—Dale J. Ream

(57) ABSTRACT

A portable generating system for converting either water or wind energy into electricity comprises a paddle wheel assembly having a housing and a plurality of impellers rotatably mounted therein. The housing defines inlet and outlet openings for receiving a fluid stream, whether water or air, therebetween so as to rotate the impellers. The impellers are axially connected to a generator for producing electricity upon impeller rotation as the fluid stream flows between the housing openings. The generator may be mounted within the paddle wheel housing adjacent the impellers or at a distance therefrom and coupled thereto with a shaft. A plurality of mounting brackets are fixedly attached to the outer surface of the housing. The generating system further includes a plurality of height-adjustable support legs that may be coupled to the mounting brackets so that the paddle wheel housing may be positioned at a predetermined height above a support surface. The support surface may be a dry ground area such that electricity is generated as a result of an air stream or may be a body of water such that electricity is generated as a result of a water stream. The system may easily be assembled and disassembled and moved between desired locations.

13 Claims, 6 Drawing Sheets

US 6,246,125 B1

PORTABLE WIND AND HYDRO ELECTRIC GENERATING SYSTEM

BACKGROUND OF THE INVENTION

This invention relates to electric generating systems and, more particularly, to a portable electric generating system for converting wind or water potential energy into electricity.

There are numerous situations where electricity is not readily available when and where it is actually needed, such as in the immediate aftermath of a natural disaster or at a remote campsite. However, potential energy is often available at or near such areas and could be converted into electricity if only a portable generator system was available to harness the potential energy.

Hydro electric generating plants and wind electric generating systems are generally known in the art. Although assumably effective for their intended purposes, the known systems are not suited for selectively utilizing either wind or water energy to generate electricity. Further, the known systems are not easily assembled, disassembled, and moved between desired locations.

Therefore, it is desirable to have a portable electric generator system which may be configured to selectively utilize either a wind or water stream to operate a generator for producing electricity. Further, it is desirable to have an electric generator system which may be easily and quickly assembled, disassembled, and moved between locations where electricity is needed or where an adequate wind or water stream is available.

SUMMARY OF THE INVENTION

A portable generator system for converting either water or wind energy into electricity includes a paddle wheel assembly having a housing with a turbine fan assembly rotatably mounted within an open space defined by the housing. The turbine fan assembly includes a plurality of impellers. The housing defines oppositely disposed inlet and outlet openings for receiving a fluid stream, either air or water, therethrough. The impellers are positioned so as to be rotated as the fluid stream passes through the housing. A dynamo or generator is axially connected to the turbine fan assembly such that electricity is generated as the impellers are rotated by the fluid stream flowing through the housing. The generator is electrically connected to a battery for storing the produced electricity. The generator may be mounted within the paddle wheel housing adjacent the turbine fan assembly or at a remote location connected thereto with a shaft.

The portable generating system includes a plurality of elongate support legs, each leg having a coupling attached to an upper end presenting a flat strike plate. Each leg also includes a pointed lower end such that each leg may be driven into a ground surface or creek bed with a hammer or other blunt instrument. A plurality of mounting brackets are attached to the ends and sides of the housing, each bracket defining an aperture through which a respective support leg may extend. Each bracket may be selectively tightened or loosened about each leg. Each leg is telescopic such that the paddle wheel housing may be positioned at a desired height so as to receive a desired air stream or water stream therethrough. Therefore, the portable generator system may be assembled and positioned over a ground surface or in a flowing body of water such that electricity is produced and stored for immediate or later use. The system may also easily be disassembled and moved to another desired location and is especially convenient for use at a temporary or moving campsite.

Therefore, a general object of this invention is to provide a portable generator system for converting water or wind energy into electricity for immediate or later use.

Another object of this invention is to provide a portable generator system, as aforesaid, which can produce enough electricity to power a campsite or a single residential dwelling.

Still another object of this invention is to provide a portable generator system, as aforesaid, which can be assembled, disassembled, and moved quickly and efficiently between desired locations.

Yet another object of this invention is to provide a portable generator system, as aforesaid, which is adjustable to a desired height position.

A further object of this invention is to provide a portable generator system, as aforesaid, which can provide a source of electricity without the use of fossil fuels such as gasoline.

A still further object of this invention is to provide a portable generator system, as aforesaid, which is easy and economical to manufacture and use.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

The preferred embodiment of the portable wind or water electric generator system 10 according to the present invention will now be described with reference to FIGS. 1 through 6 of the accompanying drawings.

Figure 1:
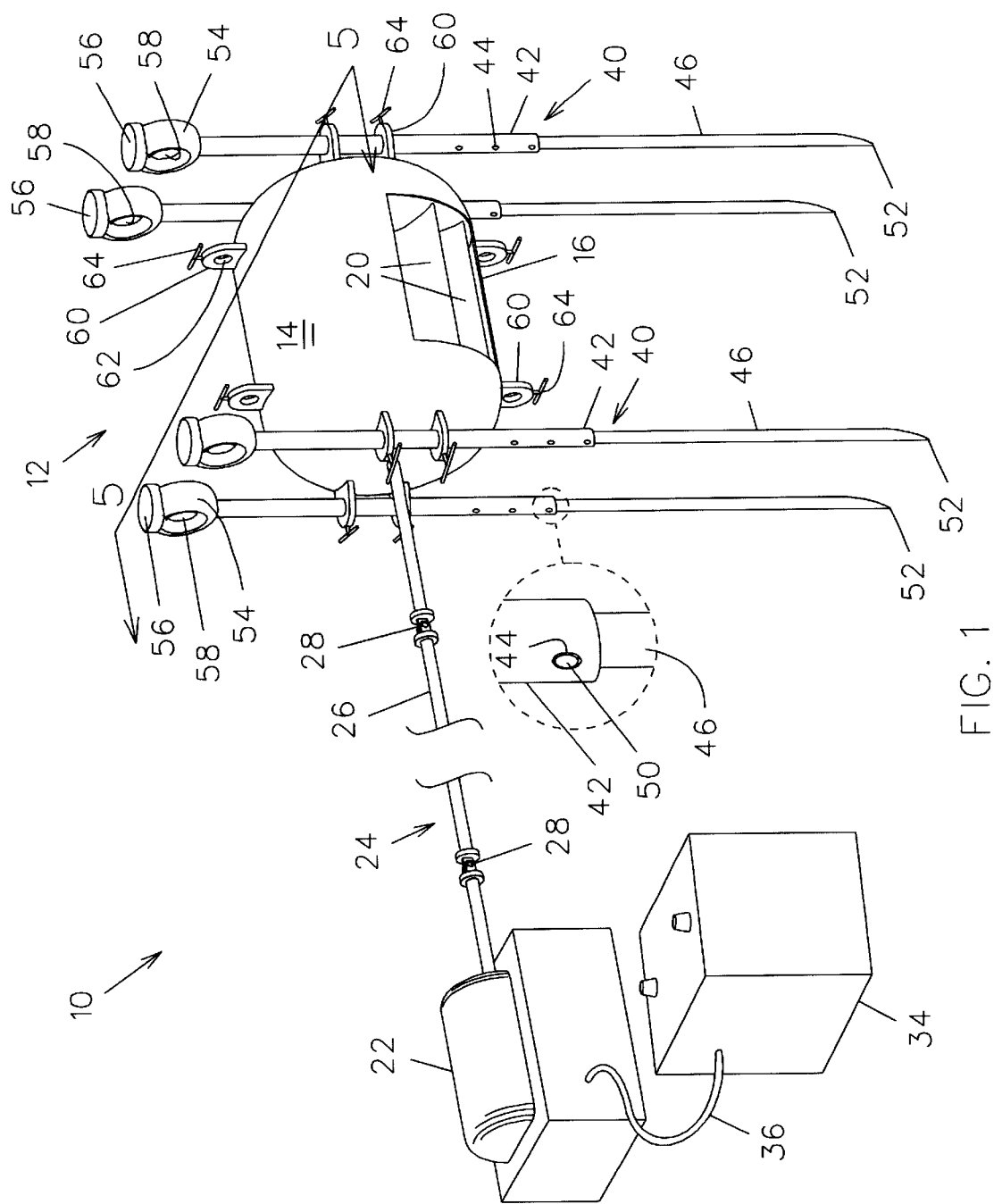
FIG. 1 is a front perspective view of a portable electric generator system according to a preferred embodiment of the present invention.
Figure 2:
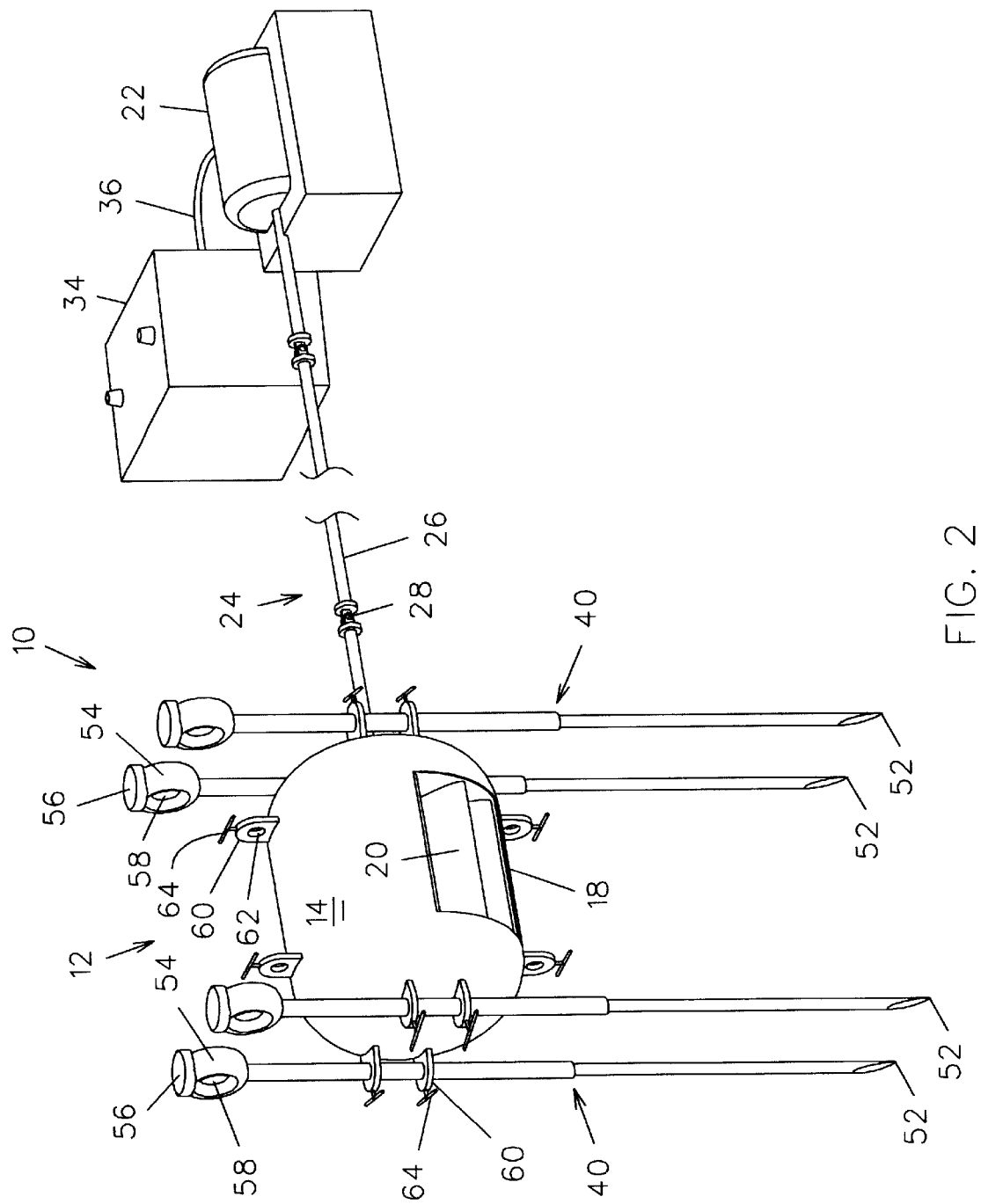
FIG. 2 is a rear perspective view of the generator system as in FIG. 1.
Figure 3:
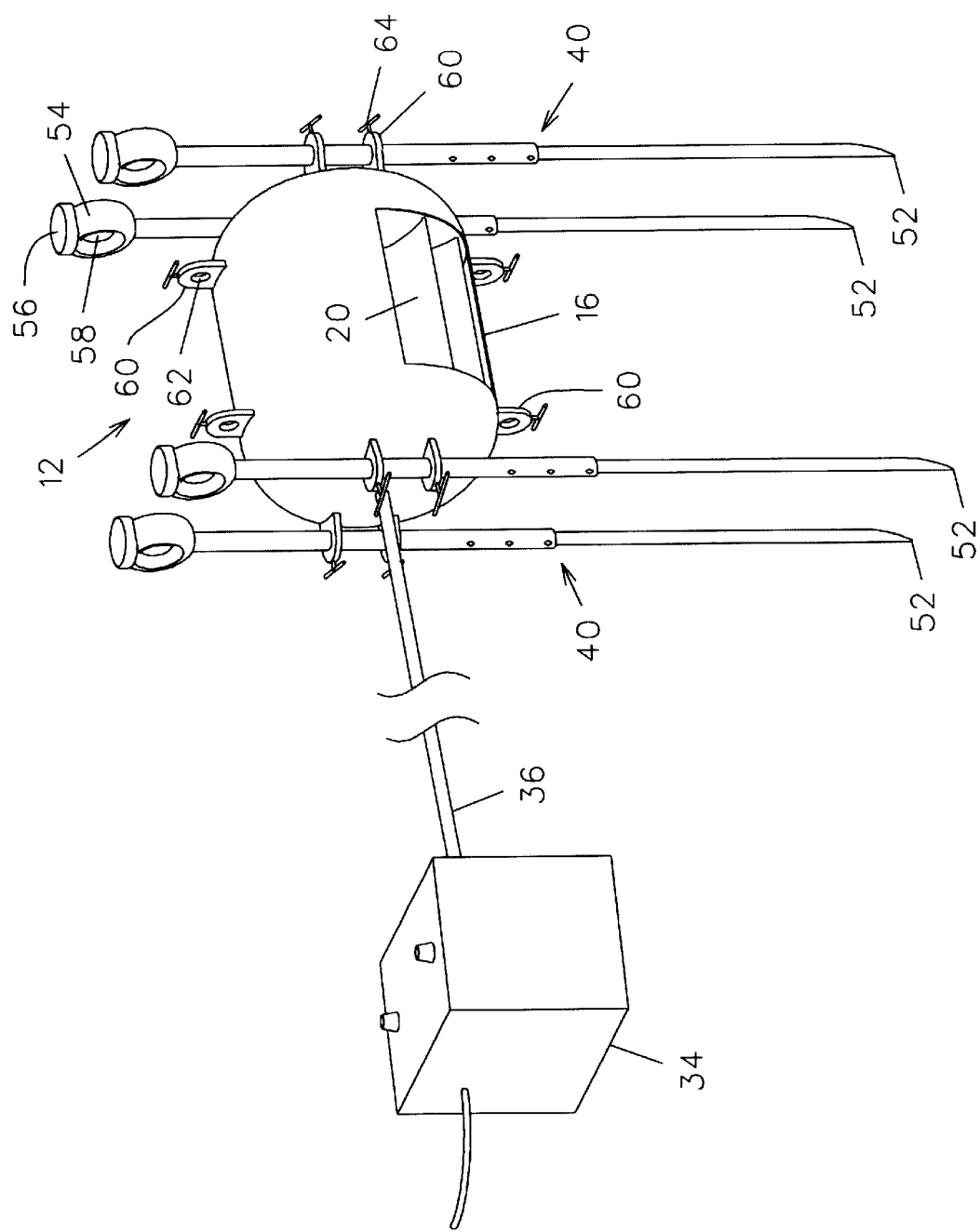
FIG. 3 is a perspective view of an alternative embodiment of the portable electric generator system.
Figure 5:
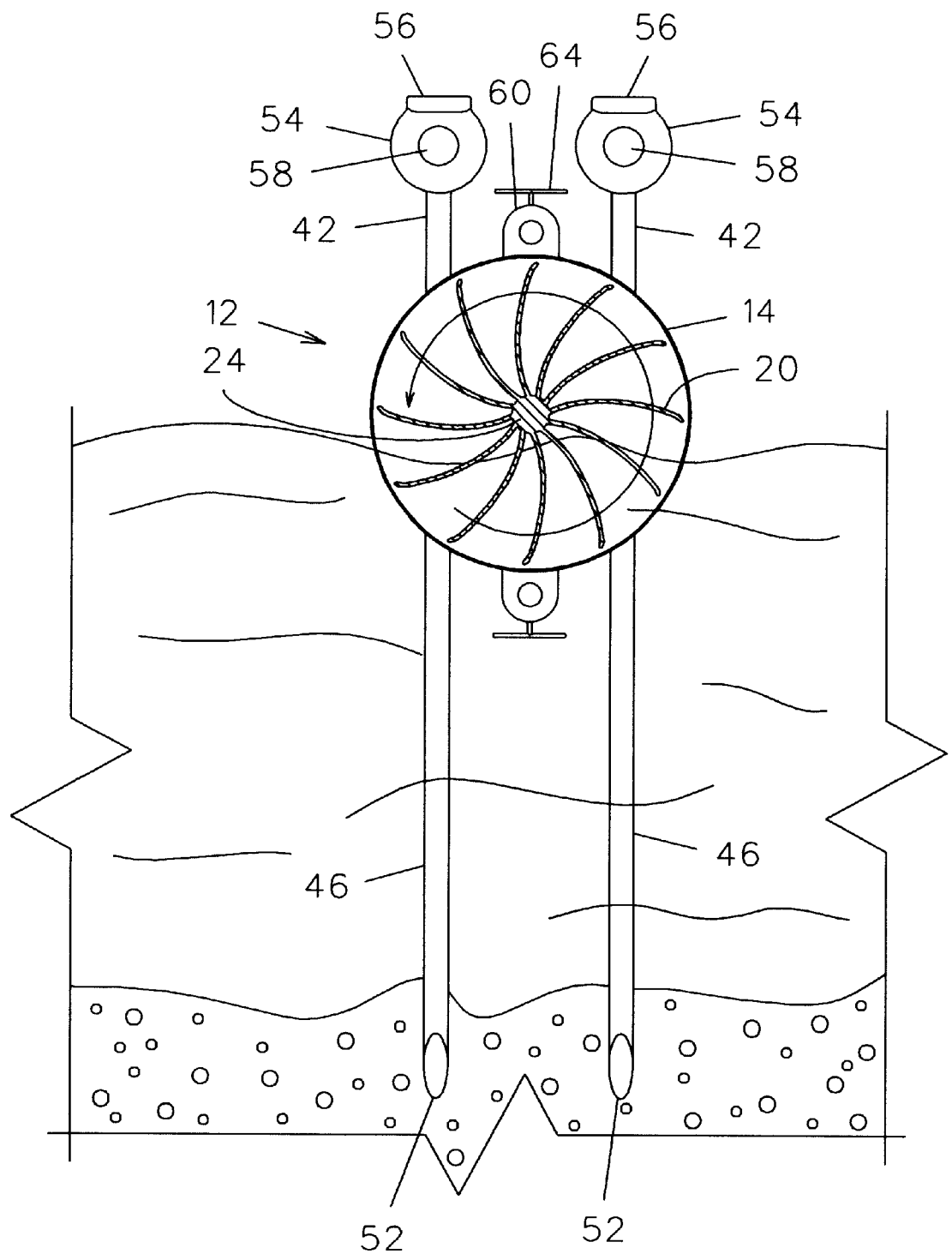
FIG. 5 is a sectional view of the generator system taken along line 5—5 of FIG. 1.

The portable electric generator system 10 includes a paddle wheel assembly 12 having a generally cylindrical housing 14 that defines an open space therein. The longitudinal wall of the housing 14 defines oppositely disposed inlet 16 and outlet 18 openings for receiving a fluid stream, either water or wind, therethrough (FIGS. 1 and 2). A turbine fan assembly is disposed within the housing that includes a plurality of impellers 20 rotatably mounted therein. The impellers 20 include predetermined length and width dimensions and are positioned within the housing 14 so as to be rotated as a fluid stream flows between the inlet 16 and outlet 18 openings. It is understood that the impellers 20 may have an arcuate configuration for improved efficiency in receiving the fluid stream (FIG. 5).

Figure 6:
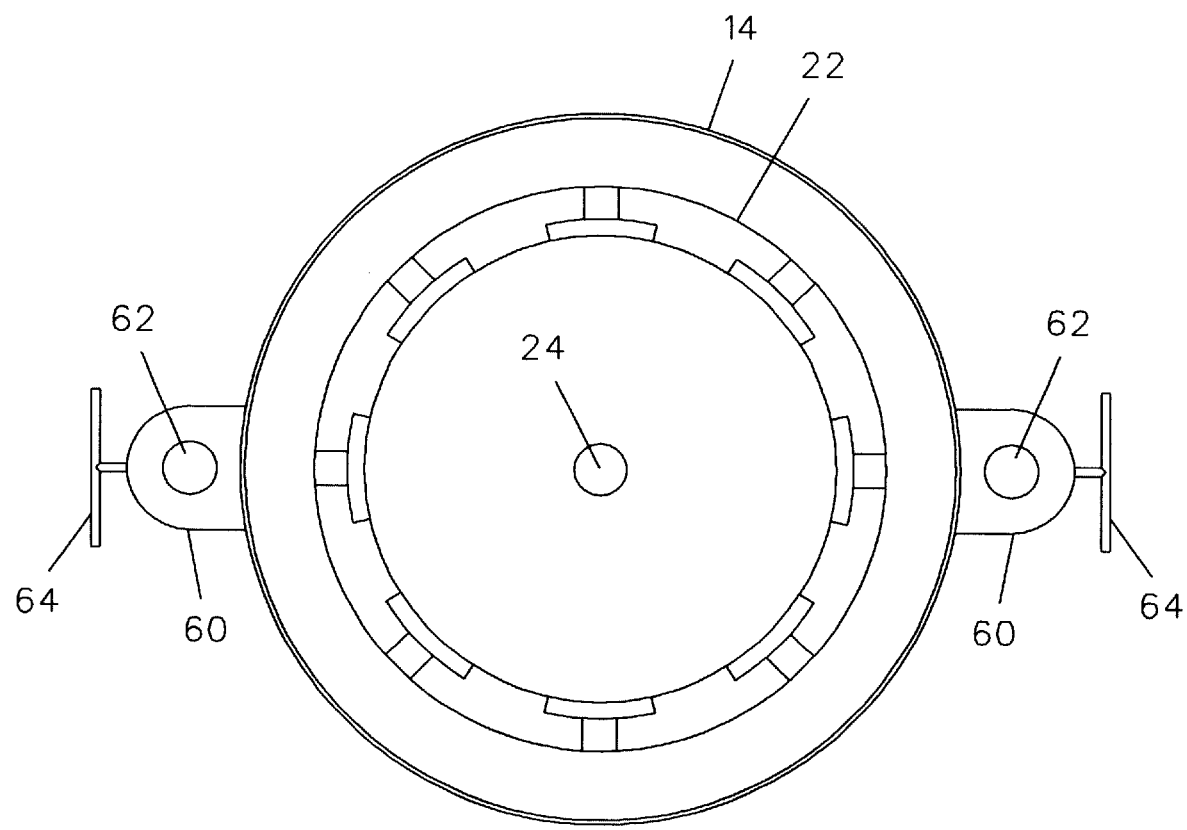
FIG. 6 is a sectional view of the generator system taken along line 6—6 of FIG. 4.

The turbine fan assembly is axially connected to a generator 22, also referred to as a dynamo, with a shaft 24 (FIG. 1). The shaft 24 may include multiple shaft portions 26 connected with U-joints 28 such that the shaft 24 may be disassembled for transport as well as to allow the generator 22 to be displaced from the paddle wheel assembly 12, as to be further described below. Alternatively, the generator 22 may be mounted within the housing 14 adjacent the impellers (FIG. 6). Generators are known in the art and operate to convert mechanical energy to electricity by electromagnetic induction. The resulting electrical current is conveyed to a battery 34 through a wire 36 for storage or use.

The generator system 10 further includes a plurality of length adjustable elongate support legs 40. Each leg 40 includes a first leg element 42 and a second leg element 46 telescopically received in the first leg element 42. Each first leg element 42 defines a plurality of spaced apart apertures 44. Each second leg element 46 includes a tab/flange 50 constructed of a pliable material such as spring steel. The flange 50 includes a generally button-like member such that the flange 50 may be released from engagement with an aperture 44 upon moderate pressure applied thereto by a user to thereby adjust the length of the respective leg 40. Therefore, the length adjustable legs 40 allow the paddle wheel housing 14 to be adjusted to a desired height as to be further described below.

A lower end 52 of each second leg element 46 presents a pointed configuration suitable for penetrating a ground surface. A bulbous coupling 54 having a flat top surface 56 is coupled to the upper end of each first leg element 42. The flat top surface 56 is constructed of a rigid material that can withstand repeated striking forces with a hammer or other blunt instrument (FIG. 1). Each coupling 54 includes a bore 58 therethrough normal to the first leg element 42 for receiving the electrical wire 36 therethrough.

Figure 4:
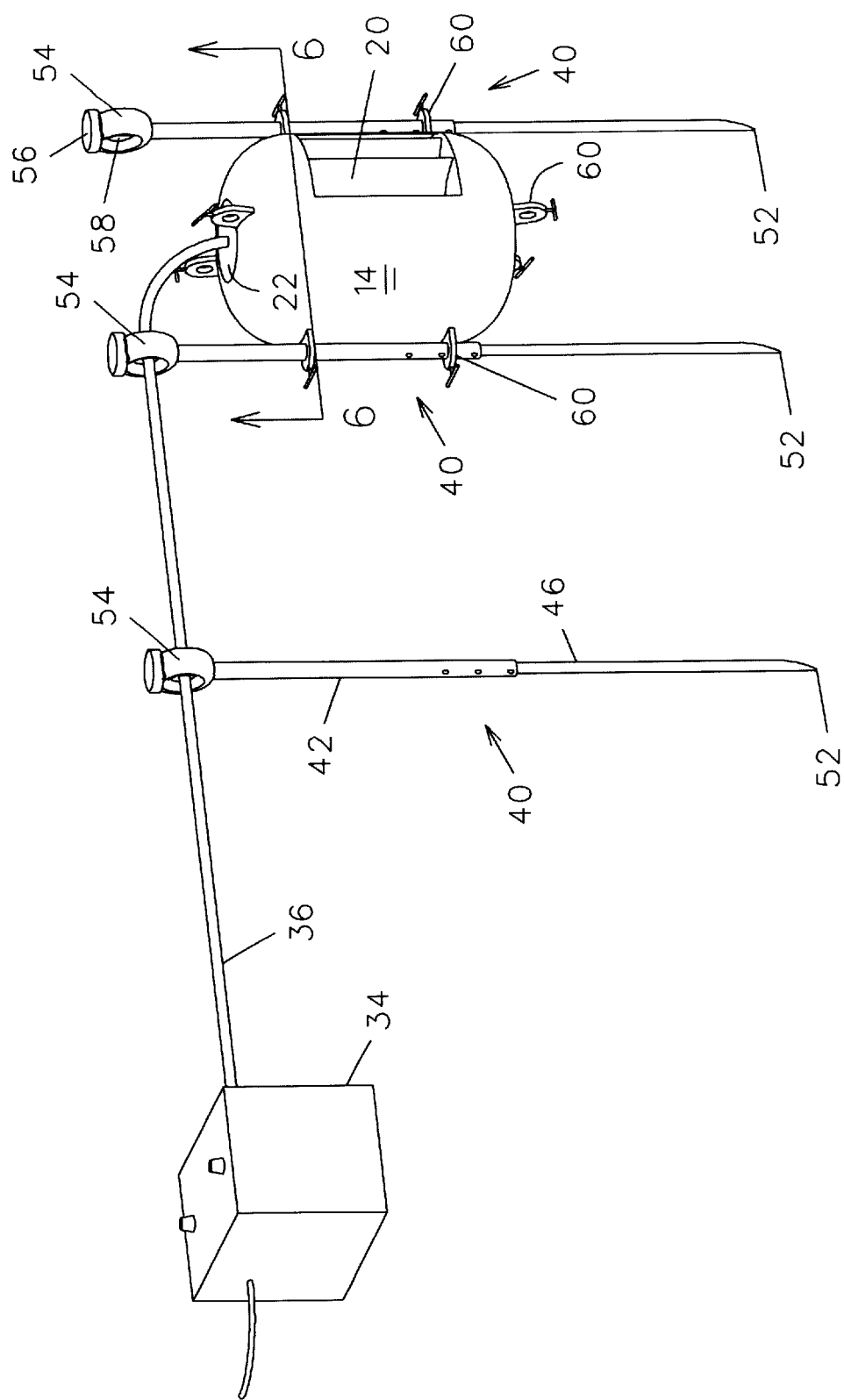
FIG. 4 is a perspective view of the generator system as in FIG. 3 shown in a vertical mounting position.

A plurality of mounting brackets 60 are fixedly attached to the outer surface of the housing 14. Each bracket 60 defines a circular aperture 62 having a diameter suitable for receiving a support leg 40 therethrough. Each bracket 60 further includes a tightening knob 64 or T-handle for selectively securing a first leg element 42 within a respective bracket aperture 62 or releasing the same. A predetermined number of mounting brackets are disposed at opposed ends of the housing such that the paddle wheel housing 14 may be mounted in a horizontal position relative to the ground (FIG. 1). Other mounting brackets are disposed on opposed sides of the outer longitudinal wall of the housing 14 such that the housing 14 may be mounted in a vertical position relative to the ground (FIG. 4). Therefore, the mounting bracket configuration enables the paddle wheel assembly to be positioned for optimal efficiency depending upon the available fluid stream.

It is appreciated that the paddle wheel assembly 12 may be mounted to a rooftop with a swivel mount assembly such that a wind stream having an optimal velocity passes through the inlet 16 and outlet 18 ports.

In use, the paddle wheel assembly 12, support legs 40, generator 22, and battery 34 may be transported to a desired location, such as a campsite or the site of a natural disaster, or wherever a natural wind or flowing water source is available. The system 10 may be transported in an automobile, all-terrain vehicle, trailer, etc. Regardless of the fluid source to be utilized, the support legs 40 may be coupled to the housing 14 before actually erecting the system. The adjustable legs 40 may be lengthened or shortened such that the fluid stream, whether wind or water, will make optimal contact with the impellers 20 as it passes through the inlet opening. Further, the legs 40 may need to be lengthened if the paddle wheel assembly is to be positioned in a flowing creek or stream. The support legs 40 are inserted through the apertures 62 of respective mounting brackets 60 and secured therein with respective tightening knobs 64. In the preferred embodiment, the generator 22 may be positioned on a ground surface spaced apart from the paddle wheel assembly 12 and axially connected to the impellers 20 therein with the elongate shaft 24 (FIG. 1). The battery 34 is electrically connected to the generator 22 with the electrical wire 36.

In the alternative embodiment in which the generator or dynamo is actually mounted within the housing 14 (FIGS. 3, 4, and 6), only the electrical wire 36 extends between the housing 14 and battery 34 (FIG. 4). It is understood that additional support legs 40 may be utilized to elevate the electrical wire 36 by passing the wire 36 through the bore 58 of respective couplings 54 (FIG. 4). Once positioned as desired, the pointed ends of the support legs 40 may be imbedded into the ground surface, creek bed, etc., by striking the top surfaces 56 of the bulbous couplings 54 with a hammer or other blunt instrument.

Accordingly, the portable generator system 10 enables a user to generate electricity from either wind or water at the actual location where electricity is immediately needed and otherwise unavailable.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A portable wind and hydro electric generating system, comprising:
    a frame assembly having a plurality of legs, each leg being length adjustable and including means for imbedding said legs in a support surface;
    a housing defining an open space and opposed inlet and outlet openings for receiving a fluid stream therethrough, said housing further comprising:
        a turbine fan assembly rotatably mounted in said open space and having a plurality of impellers positioned for rotation by the fluid stream;
        a first plurality of mounting brackets attached to opposed sides of an outer surface of said housing and adapted to releasably couple said housing to respective legs of said frame so as to selectively hold said housing in a vertical configuration relative to said support surface;
        a second plurality of mounting brackets positioned on opposed ends of said housing such that said housing may be mounted in a horizontal configuration parallel to the ground; and
        a generator mounted in said open space of said housing adjacent said turbine fan assembly, said generator being axially coupled to said turbine fan assembly for producing energy upon a rotation of said plurality of impellers.

2. A portable generating system as in claim 1 further comprising a battery electrically connected to said generator for storing electric energy produced by said generator.

3. A portable generating system as in claim 1 wherein said generator is spaced apart from said housing and axially coupled to said turbine fan assembly with an elongate shaft, said shaft adapted to rotate upon a rotation of said impellers.

4. A portable generating system as in claim 1 wherein:
    each said leg includes a first leg element and a second leg element telescopically received in said first leg element for adjusting the length of said leg; and each said first leg element defines a plurality of spaced apart apertures and each said second leg element includes a flange for selectable engagement with one of said apertures.

5. A portable generating system as in claim 1 wherein said imbedding means includes:

a collar coupled to an upper end of each leg of said frame, said collar having a flat top presenting a strike plate adapted to withstand the impact force of a hammer for driving a lower end of said leg into the support surface; and wherein said lower end of each said leg includes a pointed tip for penetrating said support surface upon an impact force upon said flat top.

6. A portable generating system as in claim 1 wherein each said mounting bracket defines an aperture adapted to slidably engage a respective leg of said frame, each said mounting bracket including means for selectively tightening or loosening said bracket about said respective leg.

7. A portable wind and hydro electric generating system, comprising:

a paddle wheel assembly having a housing and a plurality of impellers rotatably mounted in said housing, said housing defining inlet and outlet openings for receiving a fluid stream through said housing so as to rotate said impellers;

means for supporting said paddle wheel assembly a selectable distance above a support surface for efficient reception of the fluid stream through said inlet opening, said support means comprising:

a plurality of length adjustable elongate support legs each said leg including a first leg element and a second leg element telescopically received in said first leg element for adjusting the length of said leg, each said first leg element defining a plurality of spaced apart apertures and each said second leg element having a flange for selectable engagement with one of said apertures;

a first plurality of mounting brackets attached to opposed sides of an outer surface of said housing, each bracket defining an aperture adapted to receive a respective one of said legs therethrough for selectively erecting said housing in a vertical configuration relative to the ground surface;

a second plurality of mounting brackets attached to opposed ends of said outer surface of said housing for selectively erecting said housing in a horizontal configuration parallel to the ground surface;

means for selectively tightening or loosening said brackets about said legs; and a dynamo axially coupled to said plurality of impellers and adapted to produce electricity upon a rotation of said impellers.

8. A portable generating system as in claim 7 further comprising a plurality of collars, each collar being coupled to an upper end of a respective support leg and having a flat top presenting a strike plate adapted to withstand the impact force of a hammer for driving a lower end of said leg into the support surface, each said collar defining an aperture for receiving an electrical wire therethrough.

9. A portable generating system as in claim 7 further comprising a battery electrically connected to said dynamo for storing electric energy produced by said dynamo.

10. A portable generating system as in claim 7 wherein said dynamo is disposed in said housing and coupled to said impellers.

11. A portable generating system as in claim 7 wherein said dynamo is spaced apart from said paddle wheel assembly and axially coupled to said impellers with an elongate shaft, said shaft adapted to rotate upon a rotation of said impellers.

12. A portable generating system as in claim 7 wherein said fluid stream is a flowing water stream.

13. A portable generating system as in claim 7 wherein said fluid stream is a wind stream.

* * * * *